United States Patent [19]

Platkiewicz et al.

[11] Patent Number: 4,465,799
[45] Date of Patent: Aug. 14, 1984

[54] LOW FRICTION SLIDE LINING COMPOSITION AND A METHOD OF PRODUCING THE SLIDE LINING COMPOSITION

[75] Inventors: Leonard Platkiewicz; Wlodzimierz Debski; Jerzy Glowacki, all of Poznan, Poland

[73] Assignee: Osrodek Badawczo-Rozwojowy Stosowania i Obrobki Tworzyw Sztucznych Proplast, Poznan, Poland

[21] Appl. No.: 448,182

[22] Filed: Dec. 9, 1982

[30] Foreign Application Priority Data

Dec. 19, 1981 [PL] Poland .................................. 234346

[51] Int. Cl.$^3$ .............................................. C08L 63/02
[52] U.S. Cl. .................................... 523/457; 523/458; 523/459; 523/466; 523/468
[58] Field of Search ................ 523/468, 458, 457, 144; 525/490; 524/541

[56] References Cited

U.S. PATENT DOCUMENTS 2,986,546  6/1961  Naps .................................... 523/457
4,042,550  8/1977  Tuller et al. ........................ 523/458

Primary Examiner—Lewis T. Jacobs
Attorney, Agent, or Firm—Ladas & Parry

[57] ABSTRACT

The subject of the invention is a composition designed for production of slide elements and surfaces of machines and equipment, consisting of 100 parts by weight of low-molecular epoxy resin on the basis of epichlorohydrin and dian condensed with 3-15 parts by weight of phenol-formaldehyde resin modified with furfuryl alcohol, 2-15 parts by weight of an organic diluent, 15-100 parts by weight of the known inorganic fillers and, optionally 2-20 parts by weight of a polymeric material of lubricating properties in powder form. The composition is obtained as a result of the condensation of resins at a temperature of 150°-170° C. and the introduction into the post-reaction mixture of organic diluents and inorganic fillers at a temperature of about 100° C. and optionally, the introduction of a polymeric material at a temperature of 50° C.

4 Claims, No Drawings

LOW FRICTION SLIDE LINING COMPOSITION AND A METHOD OF PRODUCING THE SLIDE LINING COMPOSITION

The subject of the present invention is a low-friction slide lining composition applied in the production of slide elements and surfaces of machines and equipment, and a method of its production.

The known methods of producing slide surfaces and elements of machines and equipment comprise the use of materials possessing a friction coefficient more favorable than that of commonly used steel or cast iron. Materials usually utilized for this purpose are bronze, white metals, laminates of various kinds or special compositions of synthetic materials. They are used in the production of complete elements of equipment or special cover plates attached to cover correspond slide surfaces of co-operating parts. Compositions of synthetic materials are applied most often on slide surfaces in the form of coatings, with the application of the technologies of representation, sticking, screwing and spraying. For the reasons of low labour-consumption and the production of a high quality slide surfaces the application range of these materials gradually widens. Besides, one of the substantial advantages of linings and compositions from synthetic materials are the wide possibilities for their modification. The composition known from the Polish patent specification No. 59170 consists of 100 parts by weight of epoxy resin, 8-15 parts by weight of dibutyl phthalate, 15-60 parts by weight of plate graphite and 5-15 parts by weight of powdered bronze. The said composition is mixed before use with 8-12 parts by weight of triethylenetetraamine performing the function of a hardener, and is applied on the co-operating slide surface, and after hardening at an ambient temperature, it is levelled by grinding or scraping in order to fit it to the surface of the co-operating part.

Another composition presented in the Polish patent specification No. 88856, based on epoxy resins consists of two layers wherein the upper layer is modified by 15-30% by weight of polytetrafluoroethylene in relation to the amount of epoxy resin, and the lower layer is applied on a metal surface and contains 20-80% by weight of a filler in the form of aluminium wool or aluminium fibre.

Other known compositions containing epoxy resins, apart from the basic resin, includes various kinds of substances and fillers, such as porcelain flour, graphite, talcum, molybdenum disulfide, bronze, tin, and a number of other inorganic materials. Depending upon the quantity and the kind of fillers utilized a number of compositions with different properties are obtained. Nevertheless, all these compositions are characterized by relatively large diffusion adhesion, which is indicated by a considerable increase in the statistical coefficient of friction.

The object of the invention is to improve utilization properties of slide surfaces formed with the use of synthetic materials on the basis of epoxy resins by the application of compositions rendering surfaces with a low statistical coefficient of friction and little abrasive wear.

The essence of the invention is a low-friction slide lining composition applied in the production of slide elements and surfaces of machines and equipment, comprised of 100 parts by weight of low-molecular epoxy resin on the basis of epichlorohydrin and dian, condensed with 3-15 parts by weight of phenol-formaldehyde resin modified by furfuryl alcohol, 2-15 parts by weight of an organic diluent and 15-100 parts by weight of known fillers of inorganic origin. Optionally, the composition may also include 2-20 parts by weight of a polymeric material of lubricating properties, for example, a polyethylene of very high relative molecular mass (above 1 million) in powder form, which causes additional lowering of the coefficient of friction between co-operating parts of the equipment. Diluents can be known solvents of epoxy- and phenolformaldehyde resins or products of their mutual condensation, for example, dibutyl phthalate. It is preferable to apply so-called active diluents possessing functional groups also contained in the initial epoxy resin. For example, butyl-glycide ether or phenyl-glycide ether enables the stable binding of the diluent with the composition at the stage of its hardening. Due to their higher cost and lack of availability active diluents can be applied in smaller absolute amounts, but in mixtures with known solvents of the applied resins, for example, the mixture with dibutyl phthalate. As fillers a number of known substances of inorganic origin are applied, such as titanium white, talcum, lithophone, graphite, molybdenum disulfide, aluminium hydroxide and porcelain flour or mixtures thereof. A detailed selection of the composition of fillers is dependent upon the purpose of the composition Compositions of the above specified composition are hardened by a known method with known hardeners of epoxy resins, introduced into the mass immediately before its use. Results of the cross-linking process depend on the kind of applied hardener. The cross-linking agent most often used is triethylenetetraamine applied in an amount of 10-12 parts by weight for 100 parts by weight of epoxy resin contained in the mass of the composition.

The cross-linking process of the composition is conducted at room temperature. It is possible to apply other cross-linking agents of epoxy resins, known from literative, at an amount proportional to the content of epoxy resin in the composition. The selection of the cross-linking agent determines the temperature and the rate of product hardening.

The invention also includes a method of producing the slide composition, which steps comprise the condensing of 100 parts by weight of low-molecular epoxy resin on the basis of epichlorohydrin and dian with 3-15 parts by weight of phenol-formaldehyde resin modified by furfuryl alcohol at a temperature of 150°-170° C.; introducing into the post-reaction mixture cooled to a temperature of about 100° C., 2-15 parts by weight of organic diluents and 15-100 parts by weight of known inorganic fillers or mixtures thereof; and, optionally, adding a polymeric material of lubricating properties in powder form, for example, a polyethylene with a very high relative molecular mass at a temperature of about 50° C. The composition thus prepared can be stored. Immediately before use a hardener is introduced into the composition in an amount proportional to the content of epoxy resin in the product correspond to preset conditions and technological requirements of the composition's cross-linking.

The composition according to the invention demonstrates a number of technical and use advantages. Slide surfaces produced with the composition are characterized by high wear resistance during exploitation and reduced adhesiveness to the second rubbing pair. The introduction of polymeric substances of lubricating properties gives slide surfaces self-lubricating properties. An unexpected benefit of the composition's application is the considerable lowering of the statical coefficient of friction in relation to known compositions, which practically eliminates the stick-slip of co-operating elements.

The application of the invention is illustrated by the following examples:

EXAMPLE 1

In an autoclave provided with an agitator 50 kg of low-molecular epoxy resin on the basis of epichlorohydrin and dian (Epidian 5) and 3.5 kg of phenol-formaldehyde resin modified with furfuryl alcohol were added and the content of the reactor was heated at a temperature of 160° C. until the moment of obtaining the viscosity coefficient of the reaction mixture, of 87180 cP, measured with a rotary viscosimeter type Rheotest-2 provided with a conical-plate device at a temperature of 30° C. at the shear rate 100 s$^{-1}$. Following the condensation and cooling of the post-reaction mixture to a temperature of 90° C., 5 kg of di-n-butyl phthalate, 12.5 kg of molybdenum disulfide, 7.5 kg of graphite and 2.5 kg of titanium white were introduced, particular substances each being diluted in resin. Then at a temperature of 50° C., 5 kg of polyethylene of a relatively high molecular mass in powder form, was diluted in the mixture and the ready composition was poured into containers. The resultant composition can be used as a slide material for guides of slides of machine tools, applied by the known techniques of representation. Before applying the composition it is necessary to introduce a hardener into it, applying 0.64 kg of triethylenetetraamine for 10 kg of the composition.

EXAMPLE 2

In an autoclave as in example 1 condensation was performed of 50 kg of epoxy resin Epidian-5 with 7.5 kg of phenol-formaldehyde resin modified with furfuryl alcohol, the mixture being heated at a temperature of 170° C. until an obtained viscosity determined as in example 1, of 48340 cP at a temperature of 70° C. results. Then at a temperature of 100° C. 5 kg of butyl-glycide ether, 2.5 kg of di-n-butyl phthalate and 50 kg of molybdenum disulfide were added, and at a temperature of 50° C. 10 kg of polyethylene of a very high relative molecular mass, in powder form, is added. The composition thus obtained is designed for forming slide surfaces of heavily loaded slide bearings. Before application a hardener of epoxy resins should be added to the composition, for example, 0.4 kg of triethylenetetraamine to 10 kg of the composition.

EXAMPLE 3

In an autoclave as in example 1 at a temperature of 160° C., condensation was performed of 50 kg of epoxy resin Epidian-5 and 1.5 kg of phenol-formaldehyde resin modified with furfuryl alcohol unitl a resulting post-reaction mixture of the absolute viscosity coefficient of 24220 cP determined at a temperature of 30° C. by the method presented in example 1, is obtained. Then, at a temperature of 95° C. the following materials were introduced in sequence: 1 kg of phenyl-glycide ether and 20 kg of a mixture of inorganic fillers consisting of 5 kg of graphite, 10 kg of talcum and 5 kg of lithopohone. At the end of the process at a temperature of 50° C., 1 kg of polyethylene of very high relative molecular mass in powder form was added.

The resultant composition is designed for production of surfaces of weakly loaded bearings. To harden the composition, it is necessary to introduce immediately prior to its use, 0.8 kg of triethylenetetraamine for 10 kg of the product.

EXAMPLE 4

In an autoclave, as in example 1, condensation of 50 kg of epoxy resin Epidian-5 and 5 kg of phenol-formaldehyde resin modified with furfuryl alcohol was performed at a temperature of 170° C., to obtain a post-reaction mixture of an absolute viscosity coefficient of 290500 cP, measured at a temperature of 30° C. by the method presented in example 1. Then, at a temperature of about 100° C. 4 kg of butyl-glycide ether and 2.5 kg of di-n-butyl phthalate and 20 kg of porcelain flour, 15 kg of glass marbles and 5 kg of aluminium hydroxide were introduced.

The resultant composition is designed for fixing the position of the machine tool table in relation to the bed. Immediately before application it is necessary to introduce 0.5 kg of triethylenetetraamine for 10 kg of the composition.

What is claimed is:

1. A low-friction, slide lining composition applied in the production of slide elements and surfaces of machines and equipment, containing epoxy resin and fillers, hardened with the known cross-linking agents of epoxy resins, comprising 100 parts by weight of low-molecular epoxy resin on the basis of epichlorohydrin and dian, condensed with 3–15 parts by weight of phenol-formaldehyde resin modified with furfuryl alcohol, 2–15 parts by weight of an organic diluent and 15–100 parts by weight of the known inorganic fillers selected from the group consisting of titanium white, talcum, lithophone, graphite, molybdenum disulfide, aluminum hydroxide, porcelain flour and mixtures thereof.

2. A low-friction, slide lining composition according to claim 1, containing 2–20 parts by weight of a polymeric material of lubricating properties, selected from the group of polyethylenes possessing a molecular weight above 1 million and in powder form.

3. A low-friction, slide lining composition according to claim 2, wherein the organic diluent dibutyl phthalate, phenyl-glycide ether, a mixture thereof, or butyl-glycide ether is applied.

4. A method of producing the low-friction slide lining composition applied in the slide elements and surfaces of machines and equipment, which comprises the steps of condensing 100 parts by weight of low-molecular epoxy resin on the basis of epichlorohydrin and dian with 3–15 parts by weight of phenol-formaldehyde resin modified with furfuryl alcohol at a temperature of 150°–170° C.; introducing into the condensation product 2–15 parts by weight of an organic diluent and 15–100 parts by weight of the known inorganic fillers or mixtures thereof, at a temperature of 100° C.; adding 2–20 parts by weight of a polymeric material of lubricating properties at a temperature of 50° C., and adding, immediately prior to the composition's use, the known hardeners of epoxy resins in an amount proportional to the amount of epoxy resin present in the composition.

* * * * *